(12) United States Patent
Regelman et al.

(10) Patent No.: US 11,561,531 B2
(45) Date of Patent: Jan. 24, 2023

(54) SYSTEMS AND METHODS FOR MASTERBATCH FEED CONTROL BASED ON COLOR FEEDBACK

(71) Applicant: Ampacet Corporation, Tarrytown, NY (US)

(72) Inventors: Vadim (Dan) Regelman, Kiryat Bialik (IL); Eli Margalit, Moshav yaad (IL); Daniel Hofmann, Haifa (IL)

(73) Assignee: Ampacet Corporation, Tarrytown, NY (US)

( * ) Notice: Subject to any disclaimer, the term of this patent is extended or adjusted under 35 U.S.C. 154(b) by 282 days.

(21) Appl. No.: 17/066,023

(22) Filed: Oct. 8, 2020

(65) Prior Publication Data
US 2022/0113704 A1    Apr. 14, 2022

(51) Int. Cl.
*G05B 19/416* (2006.01)
*G01N 21/27* (2006.01)

(52) U.S. Cl.
CPC ......... *G05B 19/4166* (2013.01); *G01N 21/27* (2013.01); *G05B 2219/43156* (2013.01); *G05B 2219/45013* (2013.01)

(58) Field of Classification Search
None
See application file for complete search history.

(56) References Cited

U.S. PATENT DOCUMENTS

| | | |
|---|---|---|
| 5,103,401 A | 4/1992 | Johnson |
| 6,688,493 B2 | 2/2004 | Margalit |
| 6,966,456 B2 | 11/2005 | Margalit |
| 2016/0282185 A1 | 9/2016 | Snail |
| 2016/0339404 A1 | 11/2016 | Margalit |
| 2017/0165873 A1 | 6/2017 | Regelman et al. |

FOREIGN PATENT DOCUMENTS

| | | |
|---|---|---|
| WO | 2015/118535 | 8/2015 |
| WO | 2019/233791 A1 | 12/2019 |

OTHER PUBLICATIONS

International Search Report dated Jan. 27, 2022 for International Patent Application No. PCT/US2021/053170 (2 pages).
Written Opinion of the International Searching Authority dated Jan. 27, 2022 for International Patent Application No. PCT/US2021/053170 (7 pages).
Schuessler, et al., Delta E "Delta E 101", Jun. 21, 2020 (10 Pages). http://zschuessler.github.io/DeltaE/learn/.

*Primary Examiner* — Sean Shechtman
(74) *Attorney, Agent, or Firm* — Smith, Gambrell & Russell LLP

(57) ABSTRACT

Systems and methods are provided for controlling a color masterbatch feed rate in production of a manufactured part to match a color of the manufactured part to a target color by adjusting a concentration of masterbatch that is mixed with a raw material and fed into a processing machine for producing the manufactured part. Control of the color masterbatch feed rate is based on optical spectral properties of an in-line manufactured part, a known reference part having the target color, and an algorithm for calculating and adjusting the color masterbatch feed rate.

17 Claims, 12 Drawing Sheets

SYSTEMS AND METHODS FOR MASTERBATCH FEED CONTROL BASED ON COLOR FEEDBACK

FIELD OF THE INVENTION

The present invention relates to systems and methods for the dispensing of additive material into industrial material processing machines. In particular, the present invention discloses a system and method for optimizing the feed of color-additive materials (color masterbatches) based on in-line measurement of spectral properties of a manufactured part into which the color masterbatches are to be added, and control of a color masterbatch feeding based on the in-line measurements.

BACKGROUND OF THE INVENTION

Plastics are currently the material of choice for the manufacture of a seemingly unlimited number of products. These products are produced by a variety of industrial processes, e.g. injection molding, blow molding, extrusion, and 3-D printing. These machines produce manufactured parts from material flows that are generally a mixture of polymers (commonly referred to as resin, raw material, or virgin in the industry) in the form of small beads, colorants, and other additives (e.g. ultraviolet light inhibitors). The colorants and other additives in the mixed material flow are normally supplied as masterbatches, powders, or concentrated liquids. A masterbatch is a concentrated mixture of pigments and/or additives that is produced in advance of the production process by heating the pigments and/or additives to encapsulate the same in a carrier resin, and then cooling and cutting the carrier resin into a volume of granules.

Among target properties of interest in the manufacturing of plastic products, accurate and reliable production of a target color is especially challenging. Conventionally, plastic products are formed with a color made by feeding a masterbatch with a concentrated mixture of pigments (a color masterbatch) into a raw material for forming that plastic product, with the exact color shade of a final manufactured part depending on the composition and amount of the color masterbatch fed into the raw material. Continuously accurate control of the system is required throughout production of the plastic part to reliably and consistently attain the target color.

Correlation between the amount of color masterbatch fed into the raw material and the resulting color of the final product is a function of multiple parameters, and the accurate and efficient control of the resulting color through adjustments to the release of color masterbatch is a difficult task. In the current state of the art, systems for controlling the release of a color masterbatch to achieve a target color in a final plastic product require a complex setup with precise calibrations specific to each unique setup. For example, conventional systems generally require specifics as to: the intended geometry and surface properties of the manufactured part; the raw material type to be used in forming the manufactured part; and the specific pigments that are to be used in coloring the manufactured part, as well as the concentrations of each pigment.

Current approaches to production of plastic parts with target colors include the use of predetermined color formulations (the type of pigments and their relative concentrations) or color matching software to evaluate the concentration of each pigment to be added to a raw material, with control over feed rate parameters of the separate pigments. Another approach is that of trial-and-error, in which test runs are performed in advance to produce trial samples with varying pigment concentrations, measuring the resulting color shades of the various test run samples, and then using the measured data to determine empirical set-points and feedback control parameters for controlling subsequent production runs.

The methods used to date are limited in their practical utility. Specific pigment formulations are not always available or otherwise disclosed to the production plant. Trial-and-error approaches are generally undesirable, as they are labor intensive and necessarily result in wasted materials and time, which is further complicated when a production plant is rapidly changing between several different produced parts and/or color variations of common produced parts.

In addition to the foregoing shortcomings in determining appropriate pigment parameters of a color masterbatch, further complications arise in the accurate delivery of color masterbatches into a raw material for production of the plastic part. Conventional, plastic processing systems use volumetric and/or gravimetric feeders for accurately dispensing a targeted amount of a masterbatch for mixing with raw material, with one or more such feeders commonly installed at a throat section of an inlet to the system. Both of these feeder types have drawbacks.

Volumetric feeders operate by releasing a pre-defined volume of masterbatch into a mixing machine. These feeders provide an advantage of simplicity, in that they may be used together with a feeding screw to easily calibrate a dispensing volume of the masterbatch based on a rotation speed of the screw. However, volumetric feeders compromise accuracy for simplicity, as reliance on a volumetric measurement alone may easily result in large variances in the actual weight of masterbatch released in successive cycles, for example, as when separate cycles of masterbatch vary from one another in density, granule size, or other weight-altering parameters.

Gravimetric feeders generally operate by releasing masterbatch based on a measured weight thereof. This is typically done by adding a weighing mechanism and control system to a masterbatch feeding screw, and periodically measuring the exact weight of the released masterbatch. A control system may then use a difference between the measured weight and a predetermined set-point to determine an error signal for controlling the release of masterbatch in an exact amount defined by the set-point, usually in terms of mass-per-time unit or percent of the raw material. Gravimetric feeders can generally provide greater accuracy as compared to volumetric feeders, which results in an improved material efficiency and savings of masterbatch. Examples of gravimetric feeders are disclosed in U.S. Pat. No. 5,103,401 (Johnson), U.S. Pat. No. 6,688,493B2 (Margalit) and U.S. Pat. No. 6,966,456B2 (Margalit), the entire contents and disclosure of each of which are incorporated herein.

Both volumetric and gravimetric feeders present shortcomings in that both feeder types operate to release masterbatch based on empirical set-points (e.g., predetermined volume or weight), which can easily result in the downstream mixture having off-target properties based on variances in one or more other properties of the masterbatch or the base resin that are not adequately accounted for by the predetermined set-point.

Despite the advances provided to date in the art, there remains a need for improvements to plastic production systems for yet further advancing the state of the art, and improving the manufacture of plastic products with accurate and reliably consistent target colors.

SUMMARY OF THE INVENTION

A method for controlling a color masterbatch feed rate in production of a manufactured part comprises steps of:
a) determining optical spectral properties of a manufactured part based on a raw material of the manufactured part without any color-additives;
b) determining optical spectral properties of a target color for application to the manufactured part;
c) determining at least one pigment control parameter based on a relationship of the optical spectral properties of the manufactured part to the optical spectral properties of the target color;
d) executing a production of the manufactured part with the current pigment feed rate to produce the manufactured part from a mixture material comprising the raw material and a color masterbatch, with the color masterbatch fed to mix with the raw material at a first masterbatch feed rate; and
e) assessing optical spectral properties of the manufactured part produced form the mixed material to determine if a color of the manufactured part produced from the mixed material matches the target color, wherein
if it is determined that the color of the manufactured part produced from the mixed material matches the target color, then proceeding to perform subsequent production runs of the manufactured part with the color masterbatch fed at the first pigment feed rate; and
if the color of the manufactured part produced from the mixed material does not match the target color, adjusting the pigment feed rate based on the at least one pigment control parameter, and repeating step (d) and step (e) until it is determined that a color of the manufactured part matches the target color.

Determining the optical spectral properties of a manufactured part in step (a) comprises determining lightness and chroma properties of the manufactured part, which may include producing a manufactured part from a raw material without any color-additives and measuring the optical spectral properties of the manufactured part with a spectrometer, or estimating the optical spectral properties of the manufactured part from pre-recorded tabulated data stored in a memory of a controller of a mixing system.

Determining optical spectral properties of the target color in step (b) comprises determining lightness and chroma properties of the target color, which may include measuring the optical spectral properties of a reference part having the target color with a spectrometer, or estimating the optical spectral properties of the target color from pre-recorded tabulated data stored in a memory of a controller of a mixing system.

Selection of one or more pigment control parameters in step (c) is based on a comparison of the lightness and chroma properties of the manufactured part and the target color. Comparison of the lightness properties of the manufactured part and the target color includes setting a lightness value of the manufactured part as a threshold lightness, and determining if a lightness value of the target color is greater than or less than the threshold lightness. Comparison of the chroma properties of the manufactured part and the target color comprises setting a chroma value of the target color as a threshold chroma and determining if a chroma value of the manufactured part is greater than or less than the threshold chroma.

When a lightness of the target color is less than the threshold lightness, a lightness L is selected as the pigment control parameter with a negative correlation to a pigment concentration. When a lightness of the target color is greater than the threshold lightness, a pigment control parameter is then selected based on a comparison of the chroma properties of the manufactured part and the target color.

When a chroma of the manufactured part is greater than the chroma threshold, a chroma C is set as the pigment control parameter with a positive correlation to a pigment concentration. When a chroma of the manufactured part is less than the chroma threshold, lightness L is set as the pigment control parameter with a positive correlation to a pigment concentration.

In order to enable a single set of feed rate control parameters for all colors, there is a need to normalize the control parameter which is either positive or negative C or L error (the difference in values between the reference and measured parts). After a pigment control parameter is selected in step (c), the pigment control parameter is normalized by at least one fit curve value in such a way that constant change in C results in similar change of the control parameter. When executing a production run that will begin with a pigment concentration greater than a target pigment concentration of the target color, a pre-defined offset parameter is set for offsetting the selected pigment control parameter to account for color saturation at higher pigment concentrations, with the offset parameter determined in advance to cause a reduction in the color masterbatch feed rate when it is determined in step (e) that a color of the manufactured part produced form the mixed material does not match the target color. The pigment control parameter is further limited by a predetermined limit value to eliminate instability from a feedback control loop.

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
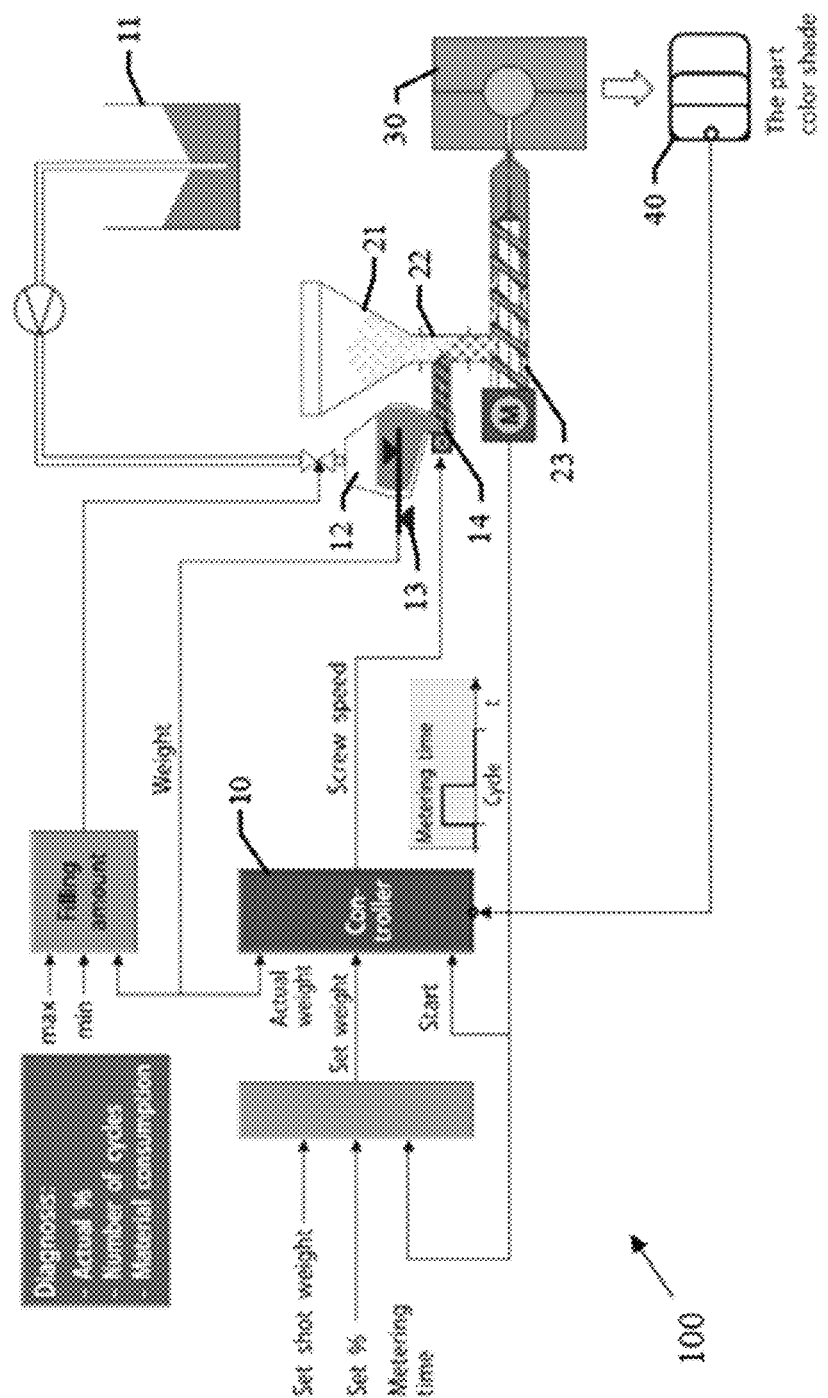
FIG. 1 schematically shows a combined colorimetric and gravimetric additive feeder system for an injection molding machine according to the present invention.

The following disclosure discusses the present invention with reference to the examples shown in the accompanying drawings, though does not limit the invention to those examples.

The use of any and all examples, or exemplary language (e.g., "such as") provided herein is intended merely to better illuminate the invention and does not pose a limitation on the scope of the invention unless otherwise claimed. No language in the specification should be construed as indicating any non-claimed element as essential or otherwise critical to the practice of the invention. Unless made clear in context, As used herein, the singular forms "a," "an," and "the" include plural referents unless the context clearly dictates otherwise. Unless indicated otherwise by context, the term "or" is to be understood as an inclusive "or." Terms such as "first", "second", "third", etc. when used to describe multiple devices or elements, are so used only to convey the relative actions, positioning and/or functions of the separate devices, and do not necessitate either a specific order for such devices or elements, or any specific quantity or ranking of such devices or elements.

The word "substantially", as used herein with respect to any property or circumstance, refers to a degree of deviation that is sufficiently small so as to not appreciably detract from the identified property or circumstance. The exact degree of deviation allowable in a given circumstance will depend on the specific context, as would be understood by one having ordinary skill in the art.

Use of the terms "about" or "approximately" are intended to describe values above and/or below a stated value or range, as would be understood by one having ordinary skill in the art in the respective context. In some instances, this may encompass values in a range of approx. +/−10%; in other instances there may be encompassed values in a range of approx. +/−5%; in yet other instances values in a range of approx. +/−2% may be encompassed; and in yet further instances, this may encompass values in a range of approx. +/−1%.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless indicated herein or otherwise clearly contradicted by context.

Recitations of a value range herein, unless indicated otherwise, serves as a shorthand for referring individually to each separate value falling within the stated range, including the endpoints of the range, each separate value within the range, and all intermediate ranges subsumed by the overall range, with each incorporated into the specification as if individually recited herein.

Unless indicated otherwise, or clearly contradicted by context, methods described herein can be performed with the individual steps executed in any suitable order, including: the precise order disclosed, without any intermediate steps or with one or more further steps interposed between the disclosed steps; with the disclosed steps performed in an order other than the exact order disclosed; with one or more steps performed simultaneously; and with one or more disclosed steps omitted.

Herein the term "masterbatch" refers to an additive material feed flow that contains color-additive materials, such as one or more pigments. The following disclosure may use variations of the term "masterbatch" and "color masterbatch" interchangeably, though it will be understood that all masterbatches referenced herein will include color-additives, though may also include additional non-color additives.

Herein, the term "feeding mechanism", and variations thereof, refers mechanisms for feeding amounts of a material flow (e.g., masterbatch flow, raw material flow, mixed material flow, etc.), and may include, though is not limited to: a screw; an auger; a belt conveyer; a vibration shaker; and the like.

Herein, the term "processing machine", and variations thereof, refers to any machine for producing a manufactured part from a material flow, and may include, though is not limited to: injection molding machines, blow molding machines, extrusion machines, and 3-D printing machines.

The present invention is inclusive of systems and methods for controlling the pigmentation of manufactured parts through controlled feed of color masterbatches in a product manufacturing line. The inventive systems and methods operate, generally, based on: in-line measurement of spectral properties of a manufactured part; comparison of the measured spectral properties of the manufactured part and spectral properties of a reference part; determination of a control parameter (e.g., a pigment control parameter) from the comparison results; and control of one or more feeding mechanisms based on the determined control parameter.

Systems and methods disclosed herein are inclusive of ones that incorporate spectrometers for performing calibration-free differential measurements of a manufactured part and a reference part, thereby enabling pigment control of the manufactured part without requiring adjustment of the system based on control parameters in advance. Such spectrometers, and methods of operating the same in masterbatch feed control, are disclosed in WO2015/118535 (Regelman, et al.); the entire disclosed and contents of which are incorporated herein by reference.

FIG. 1 schematically shows a gravimetric additive mixing system 100 according to the present invention. The system 100 is shown in combination with a processing machine 30 for producing a manufactured part 40. In system 100, a controller 10 is used to control a feeding mechanism 14 for delivering masterbatch into a throat section 22, for mixing with a raw material flow dispensed from a raw material hopper 21 to yield a mixed material flow for producing a manufactured part 40. Prior to mixing with the raw material flow, the masterbatch is drawn from a masterbatch container 11 into a masterbatch hopper 12 where it is weighed with a loss-in-weight balance 13. Dispensing of the masterbatch into the raw material flow is synchronized with operation of a feed mechanism 23 (e.g., a feed screw) that delivers the mixed material flow to the processing machine 30 that then uses the mixed material to produce the manufactured part 40.

The system 100 may be used to control the delivery of masterbatch into a raw material flow in either large, bulk volume flows or small, discrete volume flows, which may include the dispensing of individual pellets of masterbatch, one-by-one, in essentially single file. When dispensing discrete volume flows of masterbatch, it is impractical in most cases to weigh the discrete portions that are fed through a feed mechanism in a single cycle due to the minimal weight of the individual masterbatch pellets. Weighing of discrete portions is further complicated by interference, such as vibrations from operation of the system 100 itself, as well as vibrations from the operation of other nearby systems and noise in the surrounding environment. The system 100 compensates for such interferences by using a closed-loop feedback operation, between the loss-in-weight balance 13 and the computer 10, to control a weight of the discrete portions dispensed by feeding mechanism 14 through a loss-in-weight operation. This is done by weighing a plurality of dispensed discrete portions in the masterbatch hopper 12 with the loss-in-weight balance 13, dividing the measured weight by the number of dispensed discrete portions, and controlling a motor of the feeding mechanism 14 to dispense an amount of masterbatch with a predetermined weight over a given interval of time.

Systems according to the present invention may predict a color of a manufactured part that will result from the addition of a given concentration of color masterbatch through use of the Kubelka-Munk (K-M) radiation transfer model. According to the K-M model, spectral properties of a manufactured part, such as reflection $R(\lambda)$ and transmission $T(\lambda)$, depend on absorption $k(\lambda)$ and scattering $s(\lambda)$ coefficients of both the pigment and the raw material for producing the manufactured part, as well as a thickness of the manufactured part.

Assuming that the material used for producing the manufactured part is a mixture of multiple pigments with respective absorption and scattering coefficients $k(\lambda)$ and $s(\lambda)$, together with a raw material having respective absorption and scattering coefficients $k_0(\lambda)$ and $s_0(\lambda)$, then a resulting additive absorption $K(\lambda)$ and scattering $S(\lambda)$ of the mixed material may be expressed as:

$$K(\lambda)=c_1 k_1(\lambda)+c_2 k_2(\lambda)+ \ldots +c_n k_n(\lambda)+c_0 k_0(\lambda); \text{ and} \quad [1]$$

$$S(\lambda)=c_1 s_1(\lambda)+c_2 s_2(\lambda)+ \ldots +c_n s_n(\lambda)+c_0 k_0(\lambda), \quad [2]$$

where $c_1, c_2, \ldots, c_n$ are concentrations of individual additive materials and $c_0$ is the concentration of the base, raw material.

According to the K-M model, the reflection ($R_\infty$) and transmission ($T_\infty$) for the optical spectrum of an infinitely thick material is expressed as:

$$R_\infty = 1 + \frac{K}{S} - \left[\left(1+\frac{K}{S}\right)^2 - 1\right]^{\frac{1}{2}}, \text{ and} \quad [3]$$

$$T_\infty = 0, \quad [4]$$

with reflection ($R_0$) and transmission ($T_0$) for a material of finite thickness expressed as:

$$R_0 = R_\infty\left[\frac{1-\exp(-2z)}{1-R_\infty^2 \exp(-2z)}\right]; \text{ and} \quad [5]$$

$$T_0 = (1-R_\infty^1)\left[\frac{\exp(-z)}{1-R_\infty^2 \exp(-2z)}\right], \quad [6]$$

where z is the optical thickness of the material, based on a physical thickness D, expressed as:

$$z=D[K(K+2S)]^{1/2} \quad [7]$$

The reflection ($R_0$) and transmission ($T_0$) properties may be transformed into color coordinates (e.g., xyY, Lab, Luv, HSV, sRGB, XYZ, etc.) according to a well-known process of color coordinate conversion, such as those disclosed in WO2015/118535 (Regelman, et al.), which is incorporated herein by reference.

Figure 2A:
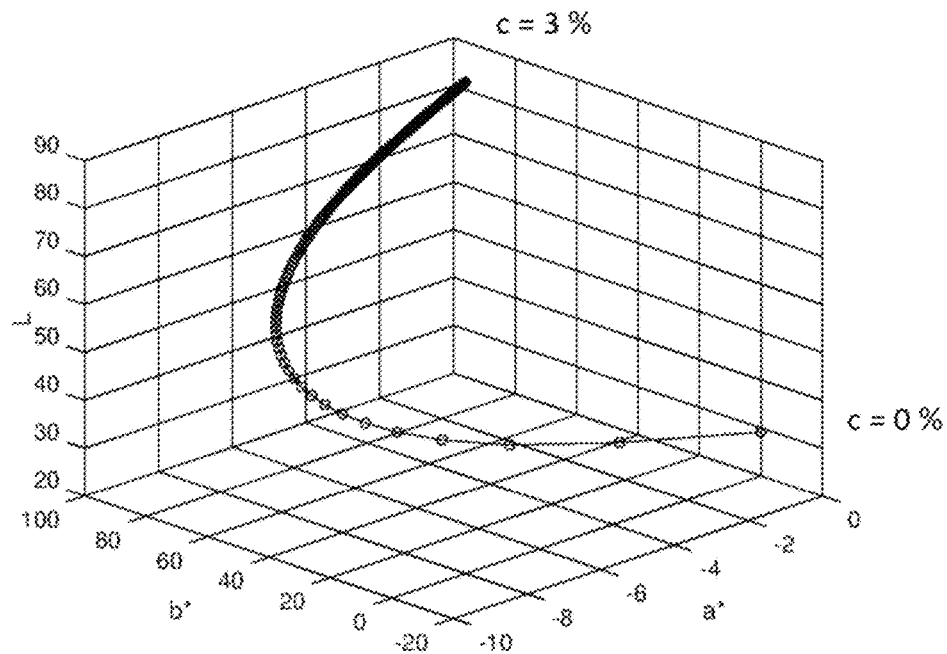
FIG. 2a shows a color 3-D diagram of La*b* color coordinates for an increasing amount of pigment concentration for an exemplary raw material and pigment type.
Figure 2B:
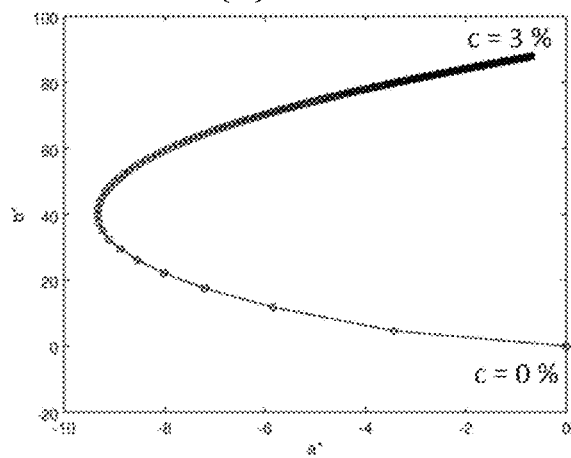
FIG. 2b shows the color diagram of a* and b* values of the La*b* color coordinates for an increasing amount of pigment concentration for an exemplary raw material and pigment type.
Figure 2C:
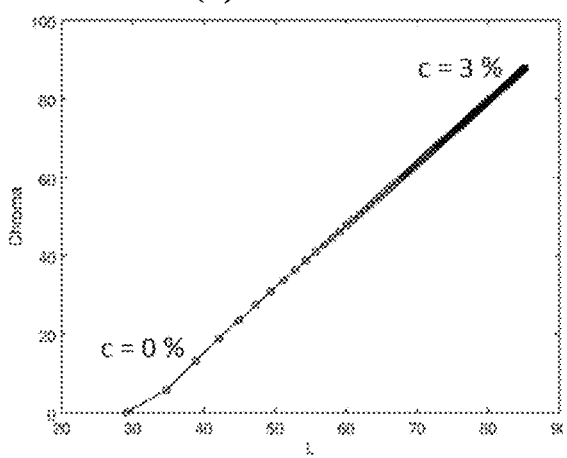
FIG. 2c shows the color diagram of chroma (C) and lightness (L) values of the La*b* color coordinates for an increasing amount of pigment concentration for an exemplary raw material and pigment type.

FIGS. 2a-2c show an example of La*b* model results for a material mixture that may be used in the production of a plastic manufactured part—in this instance, a polypropylene base resin mixed with equivalent fractions of Pigment Yellow 14 and $TiO_2$. In these models, individual data points are represented by circle points "○" that are mapped based on: lightness (L), between black (0) and white (100); a green-red scale (a*), measuring a color channel between green (−) and red (+); a blue-yellow scale (b*), measuring a color channel between blue (−) and yellow (+); chroma (C), expressing a vividness of the pigmentation; and overall pigment concentration (c). Each successive circle point in these figures represents a difference of 0.01% of pigment.

FIG. 2a shows a three-dimensional color diagram of La*b* color coordinates. At low pigment concentrations (e.g., c=0%) there is observed a relatively substantial change in color shade of the manufactured part with each successive change in pigment concentration (c), as compared to higher pigment concentrations (e.g., c=3%), where saturation occurs, and there is observed relatively little change in color shade with each successive change in pigment concentration. FIG. 2b shows a color diagram of color scales a* and b* corresponding to the La*b* color coordinates in FIG. 2a; and FIG. 2c shows a color diagram of lightness (L) and chroma (C) values corresponding to the La*b* color coordinates in FIG. 2a. As shown in FIGS. 2b-2c, the color parameters vary non-linearly and non-monotonically with pigment concentration (c), making their direct use as a pigment control parameter for controlling a pigment feed rate impractical without using control parameters normalized by a factor specific for each color shade, base resin and pigments concentration.

Figure 3A:
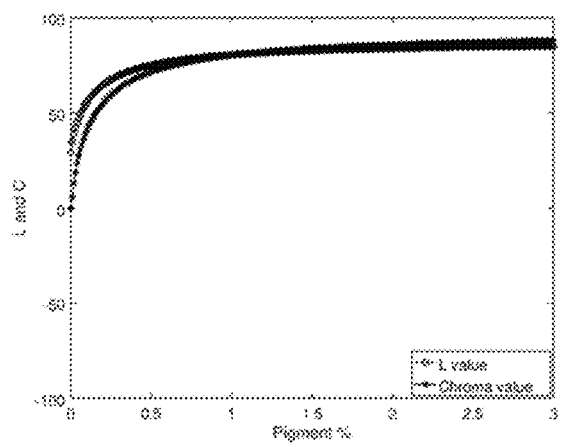
FIG. 3a shows lightness (L) and chroma (C) values of La*b* color coordinates for an increasing pigment concentration.
Figure 3B:
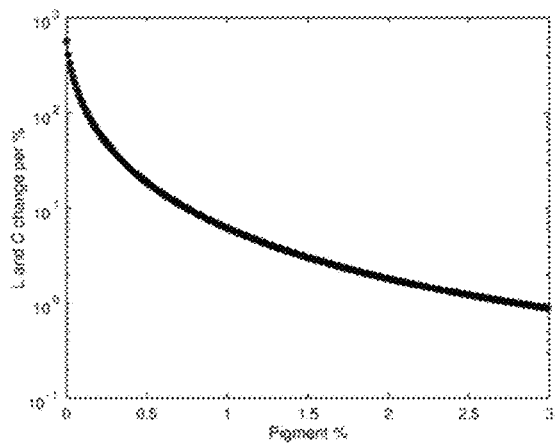
FIG. 3b shows lightness (L) and chroma (C) values varying with pigment concentration.

FIG. 3a shows the lightness (L) and chroma (C) values of La*b* color coordinates for an increasing pigment concentration c (%) from the example shown in FIG. 2; and FIG. 3b shows the corresponding lightness and chroma slope values (first derivative), as a change in lightness (L) and chroma (C) per unit change of pigment concentration c (%), for the data in FIG. 3a. In this example, lightness (L) and chroma (C) both respond similarly to changes in pigment concentration c (%), with both displaying a positive correlation to changes in pigment concentration, in that both lightness and chroma increase as pigment concentration is increased (FIG. 3a); and with both displaying relatively large changes when additional pigment is added at lower pigment concentrations and relatively smaller changes when additional pigment is added at higher pigment concentrations (FIG. 3b).

In an instance such as that shown in FIGS. 3a-3b, a feed rate of color masterbatch for effecting pigment concentration in the production of a manufactured part may be controlled by using either lightness (L) or chroma (C) as a pigment control parameter with a positive correlation, meaning that an increase to masterbatch feed rate will increase the lightness and chroma and a decrease to masterbatch feed rate will decrease the lightness and chroma. However, as discussed in the following examples, there may be instances when either lightness or chroma may be more effective than the other for controlling pigment of a manufactured part and the correlation sign will depend on the specific color shade.

In a first instance, concerning a vibrant color shade (e.g., orange) with a relatively saturated concentration (c>1% in a part having a few mm thickness), the chroma value of the mixture may be relatively low and successive additions of a "bright" pigment may greatly increase the chroma value. In such instances, chroma may be used as a pigment control parameter for controlling the dispensing of color masterbatch with a positive correlation. However, in a second instance, concerning a white pigment, the chroma value may remain close to zero regardless of the pigment concentration, though the lightness value may increase greatly with successive additions of pigment. In such instances, lightness may be used as a pigment control parameter for dispensing of color masterbatch with a positive correlation.

In another example, there may be instance concerning the addition of a dark green pigment to a relatively non-transparent part that is to be produced of a pure resin raw material that has substantially no pigment, with a lightness value of (L=30). In such an example, successive additions of the dark green pigment may yield moderate changes to the chroma value, though with a possible change in correlation upon exceeding a certain pigment concentration. For example, at first, successive additions of pigment may result in an increase to chroma; though, after reaching a certain pigment concentration, further additions of pigment might then result in a decrease to chroma. It might also be the case that as more dark green pigment is successively added, the manufactured part will become darker and lightness will continuously and rapidly decrease. In such an instances, lightness may be used as a pigment control parameter for controlling the dispensing of color masterbatch, though with a negative correlation, meaning that lightness will decrease as pigment concentration is increased and lightness will increase as pigment concentration is decreased.

Figure 4A:
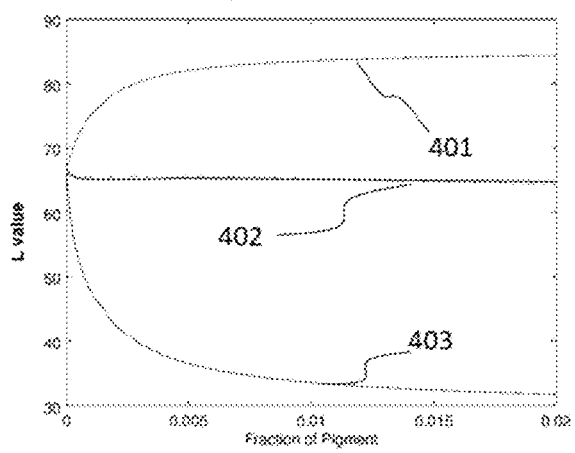
FIGS. 4a-4b show the lightness (L) and chroma (C) values versus fraction of pigment in a mixture with base resin for three different pigments.
Figure 4B:
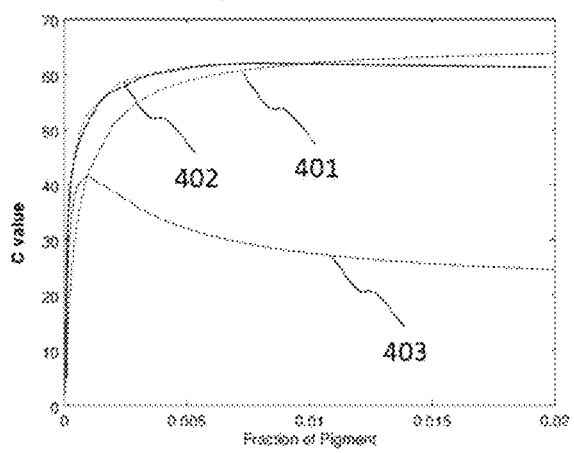

FIGS. 4a-4b show data from three examples in which three different pigments are added to a base resin, with observation of the dependence of lightness (L) and chroma (C) on changes in pigment concentration (c). In these figures, line 401 corresponds to a first mixture of Pigment Yellow 14 (50%)+$TiO_2$ (50%); line 402 corresponds to a second mixture of Pigment Yellow 17; and line 403 corresponds to Pigment Green 7. Again, relatively large changes to lightness (L) and chroma (C) are generally observed with the addition of pigment at lower pigment concentrations, while the addition of pigment at higher pigment concentrations yields relatively smaller changes.

As to mixture 401, there is observed a positive correlation of both lightness (L) and chroma (C) relative to changes in pigment concentration (FIGS. 4a-4b), with both lightness and chroma increasing as pigment concentration is increased. Thus, for mixture 401, either lightness or chroma may serve as a positive pigment control parameter (e.g., a control parameter with a positive correlation) for controlling masterbatch feed. As to mixture 402, there is observed an essentially neutral correlation between lightness (L) and pigment concentration, with substantially no change in lightness as pigment concentration is increased (FIG. 4a); though a mostly positive correlation is seen between chroma (C) and pigment concentration, with chroma increasing as pigment concentration is increased (FIG. 4b). Thus, for mixture 402, chroma may be preferred as a positive pigment control parameter for controlling masterbatch feed. As to mixture 403, there is observed a negative correlation between lightness (L) and pigment concentration, with lightness decreasing as pigment concentration is increased (FIG. 4a); and there is seen a variable correlation between chroma and pigment concentration (FIG. 4b), with chroma first increasing as pigment concentration is increased, though subsequently decreasing as pigment concentration is increased. Thus, for mixture 403, lightness may be preferred as a negative pigment control parameter (e.g., a control parameter with a negative correlation) for controlling masterbatch feed.

Figure 5A:
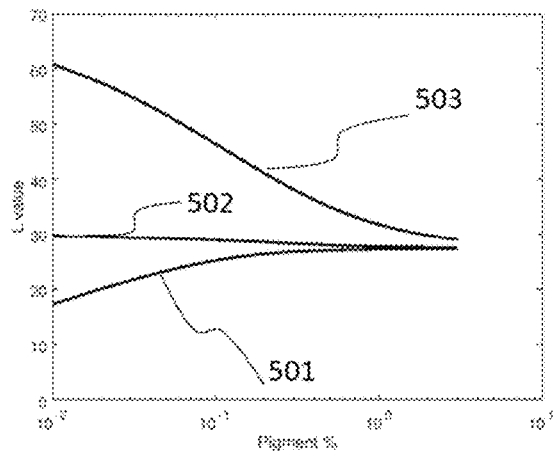
FIGS. 5a-5b show lightness (L) and chroma (C) values versus fraction of pigment in the a mixture for three different parts made of base resin with no added pigment.
Figure 5B:
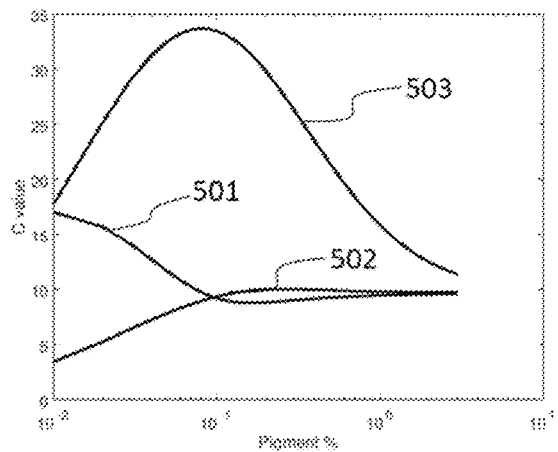

FIGS. 5a-5b show additional test data for the dependence of lightness (FIG. 5a) and chroma (FIG. 5b) on changes to concentration (on a log scale) of a dark green pigment. In this example, the three cases 501, 502, 503 differ from one another in that the manufactured part produced in each has a different lightness (L) in the absence of added pigment. While not being bound by theory, it is believed that changes in the raw material type or grade, as well as the geometry or surface roughness of the manufactured part, may account for the difference in lightness between the separate cases. Nonetheless, it is clear from these cases 501, 502, 503 that lightness (L) and chroma (C) behavior is different, and in some instances non-monotonous. This shows that changes in lightness (L) and chroma (C) depend not only on the pigments added through a color masterbatch, but also on a base color of the manufactured part as would result from the raw material without any color-additives.

To better understand the behavior of lightness and chroma, a number of pigments were tested to evaluate changes in lightness (L) and chroma (C) that result from successive additions of pigment to a base resin to increase an overall pigment concentration. Table I below lists the pigments selected for this testing.

TABLE I

| | |
|---|---|
| 1 | Pigment violet 19 |
| 2 | Pigment red 5 |
| 3 | Cinquasia Red L 4100 |
| 4 | Iron Oxide Red |
| 5 | Pigment orange 13 |
| 6 | Yellow 14 |
| 7 | Yellow 17 |
| 8 | Titanium yellow 0.8-1.2 um |
| 9 | Pigment Green 36 |
| 10 | Pigment Green 7 |
| 11 | Beta-type Pigment Blue 15:3 + TiO2 50% |
| 12 | Alpha-type Pigment Blue 15:2 + TiO2 50% |
| 13 | Iron Oxide Black |
| 14 | Titanium Dioxide |

Testing was conducted by mixing combinations of the selected pigments from Table I, with each mixture being made in several variations in which the ratio of pigment 1 to pigment 2 is varied, based on the percentage of pigment 2 ranging from 0% (pigment 1 only) to 100% (pigment 2 only). Table II below lists the combinations of pigments that were tested, each of which was tested over the complete ratio range of 0% to 100%.

TABLE II

| Mixture ID | Pigment 1 | Pigment 2 |
|---|---|---|
| 1 | 1 | 6 |
| 2 | 1 | 8 |
| 3 | 1 | 9 |
| 4 | 1 | 11 |
| 5 | 1 | 13 |
| 6 | 1 | 14 |
| 7 | 2 | 13 |
| 8 | 3 | 13 |
| 9 | 4 | 13 |
| 10 | 5 | 9 |
| 11 | 5 | 12 |
| 12 | 5 | 13 |
| 13 | 5 | 14 |
| 14 | 6 | 9 |
| 15 | 8 | 9 |
| 16 | 6 | 12 |
| 17 | 6 | 13 |
| 18 | 6 | 14 |
| 19 | 7 | 13 |
| 20 | 8 | 13 |
| 21 | 8 | 14 |
| 22 | 9 | 11 |
| 23 | 9 | 12 |
| 24 | 9 | 13 |
| 25 | 9 | 14 |
| 26 | 10 | 13 |
| 27 | 10 | 14 |
| 28 | 11 | 13 |
| 29 | 11 | 14 |
| 30 | 12 | 13 |
| 31 | 12 | 14 |
| 32 | 13 | 14 |

Figure 6:
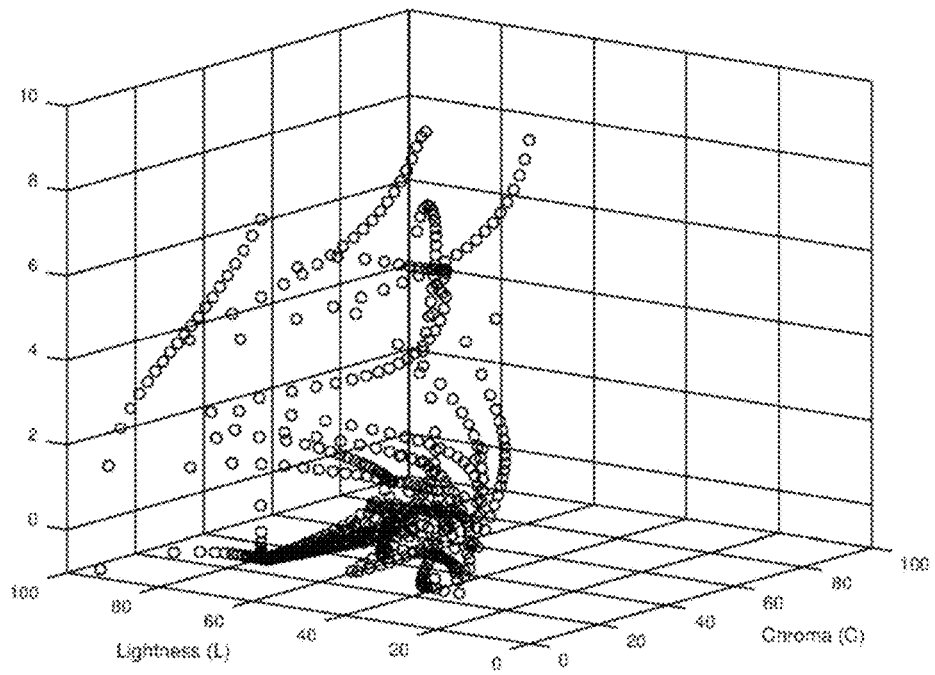
FIG. 6 shows chroma change with increased pigment for a variety of colors resulting from many different pigments and their mixtures.

In these tests, the resulting changes to lightness (L) and chroma (C) based on a change to pigment concentration, dL/dc (%) and dC/dc (%) respectively, were evaluated at a pigment concentration c (%) of approximately c=1%. FIG. 6 shows the differences in lightness and chroma for target colors adopting the several separate mixtures in Table II, based on differences in pigment concentration dL/dc (%), with variation of the pigment concentration c (%) being around the nominal c=1%. The x and y axes are lightness (L) and chroma (C) of the reference part, with 1% added pigment.

As discussed above, in an example where there is a significant and monotonic change in either lightness or chroma (e.g., an observable, and consistent, positive or negative correlation with pigment concentration), then either such spectral property may be used as a pigment control parameter for controlling a color masterbatch feed rate, either as a positive or negative pigment control parameter. However, in examples where there is an insignificant and/or non-monotonic change in either lightness or chroma (e.g., an indiscernible, neutral, or variable correlation with pigment concentration), then the spectral property displaying such character will not be suitable for use as a pigment control parameter for controlling a color masterbatch feed rate. A problem arises then when it is necessary to produce a manufactured part with a pigment (or pigment combination) that lacks an acceptable correlation between either lightness or chroma based on a pigment concentration—e.g., unsuitable dL/dc (%) and dC/dc (%) characteristics. In particular, when producing parts with such pigments, it is difficult, if not impossible, to control the feed of color masterbatch at an appropriate rate to accurately and reliably attain the target color. Though possible, it is in most cases simply impractical to manually select, for each color, raw material, and part surface type, the control parameter and normalization factors based on series of calibration parts with varying pigment concentrations and/or numerical simulation results.

Figure 7A:
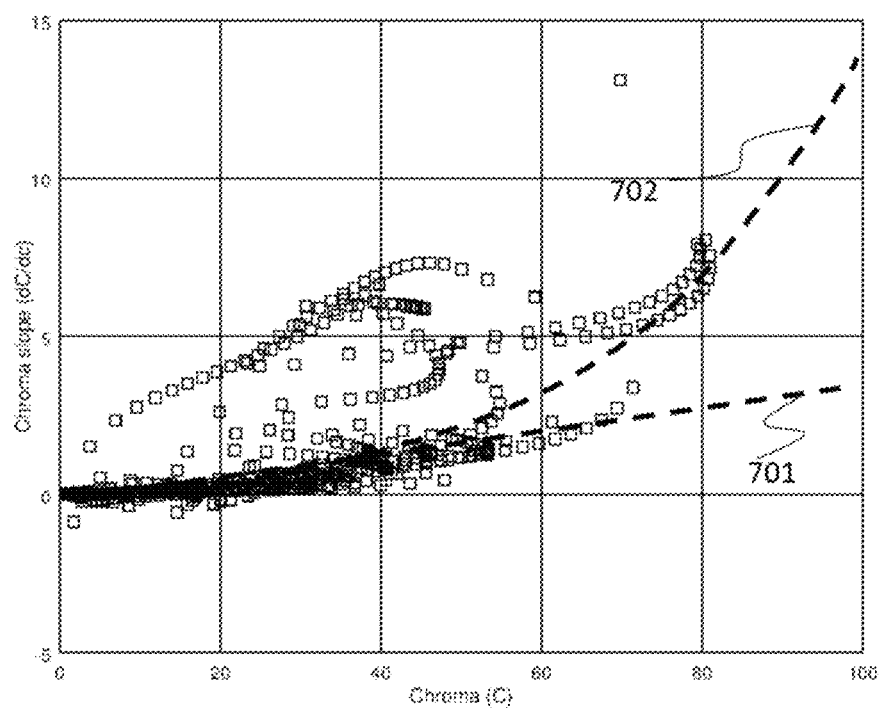
FIGS. 7a-7b show the change in chroma (C) and lightness (L) values with the added pigment for a variety of colors resulting from many different pigments and their mixtures versus the reference color Chroma value.
Figure 7B:
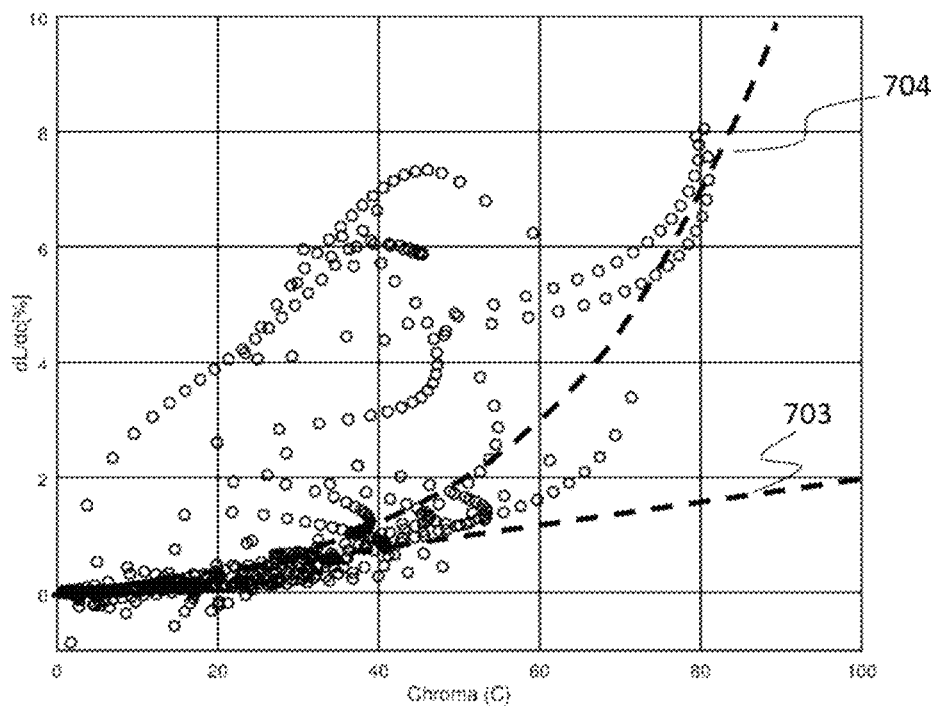

FIGS. 7a-7b show the same data as in FIG. 6, though relative to the reference color chroma (C) only—with FIG. 7a showing a chroma change dC/dc (%) relative to the reference chroma (C), and FIG. 7b showing a lightness change dL/dc (%) relative to the reference chroma (C).

As seen in FIGS. 7a-7b, chroma values greater than approximately twenty (C>~20) almost always have a positive chroma slope dC/dc (%) and a positive lightness slope dL/dc (%), regardless of the specific pigment; while chroma values equal to or greater than approximately twenty-five (C≥~25) consistently have a positive chroma slope dC/dc (%) and a positive lightness slope dL/dc (%). Thus, for pigments with chroma values (C>~20), and preferably (C>~25), chroma value (C) may be used as a pigment control parameter. However, it is preferable that a pigment control parameter be independent of the specific pigment, such that changes in the pigment control parameter will result in a similar change of the control variable for any pigment. This may be achieved by normalizing (dividing) the control variable by fitting curves, such as fitting curves 701/702 for chroma slope dC/dc (%) and fitting curves 703/704 for lightness slope dL/dc (%), so as to yield control variable values that are suitable for use with a wide array of pigments.

Figure 8A:
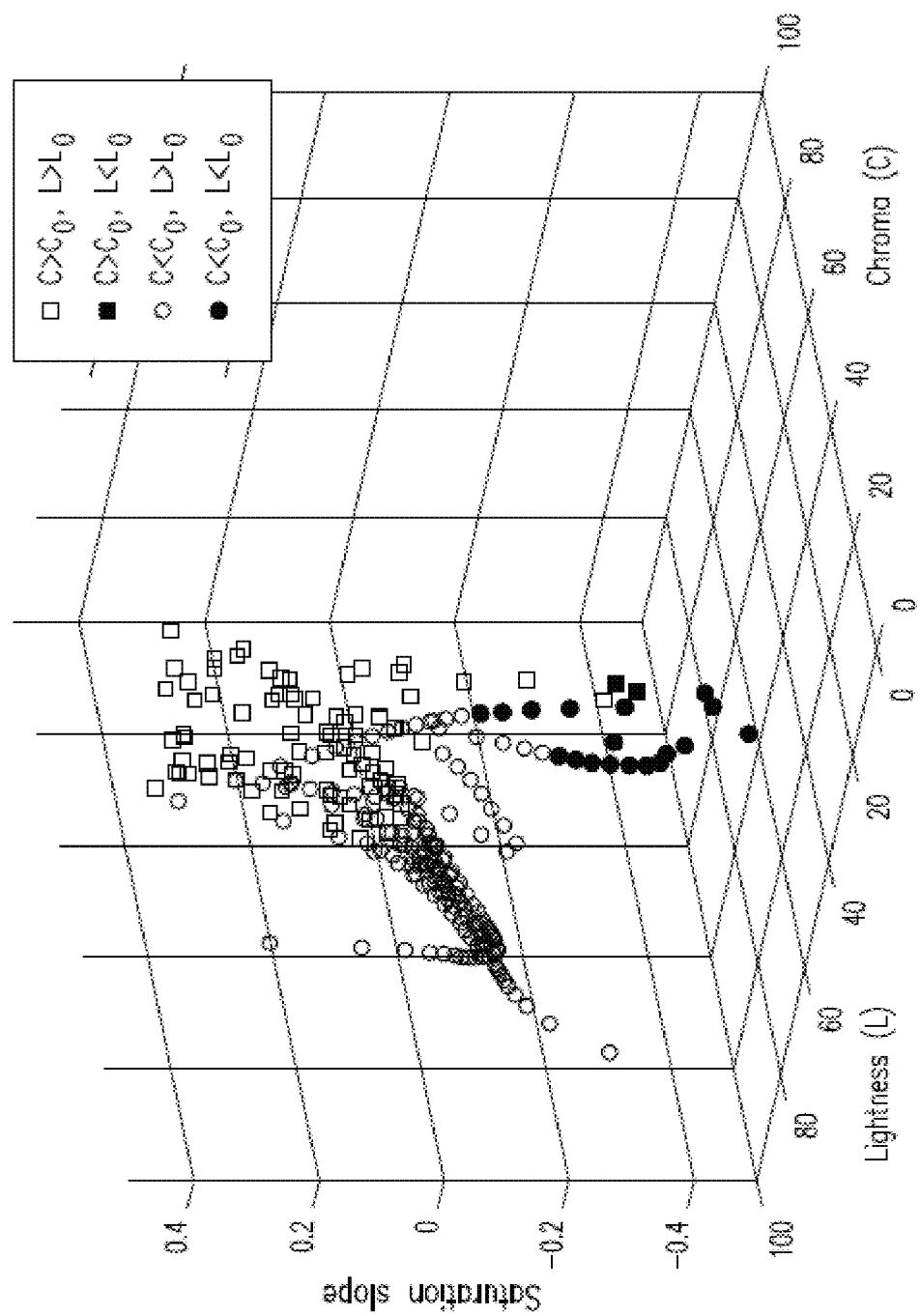
FIGS. 8a-8b show changes in chroma (C) and lightness (L) values as pigment is added for a variety of colors resulting from many different pigments and their mixtures divided into groups by their relation to the threshold chroma $C_0$ and threshold lightness $L_0$.
Figure 8B:
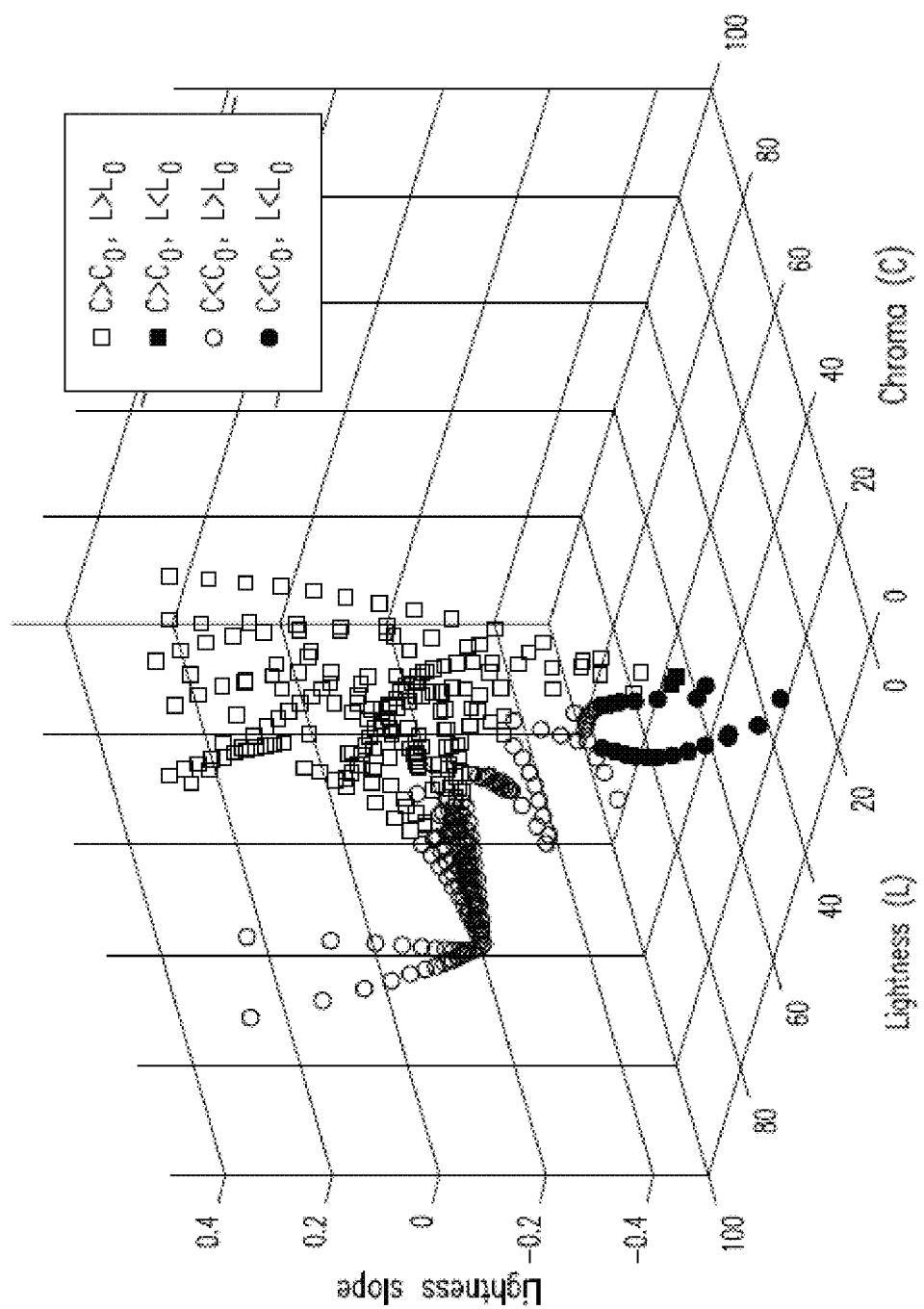
Figure 9A:
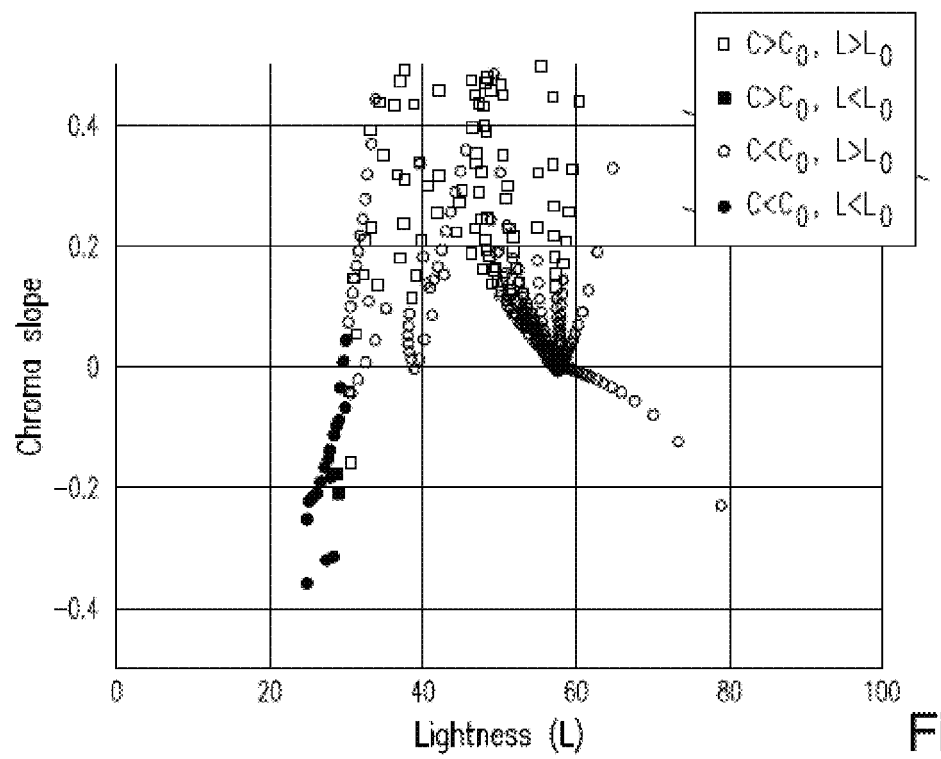
FIGS. 9a-9d show projected views of the data from FIG. 8, with optimal pigment control parameters identified for each color group divided by their relation to the threshold chroma $C_0$ and threshold lightness $L_0$ values.
Figure 9B:
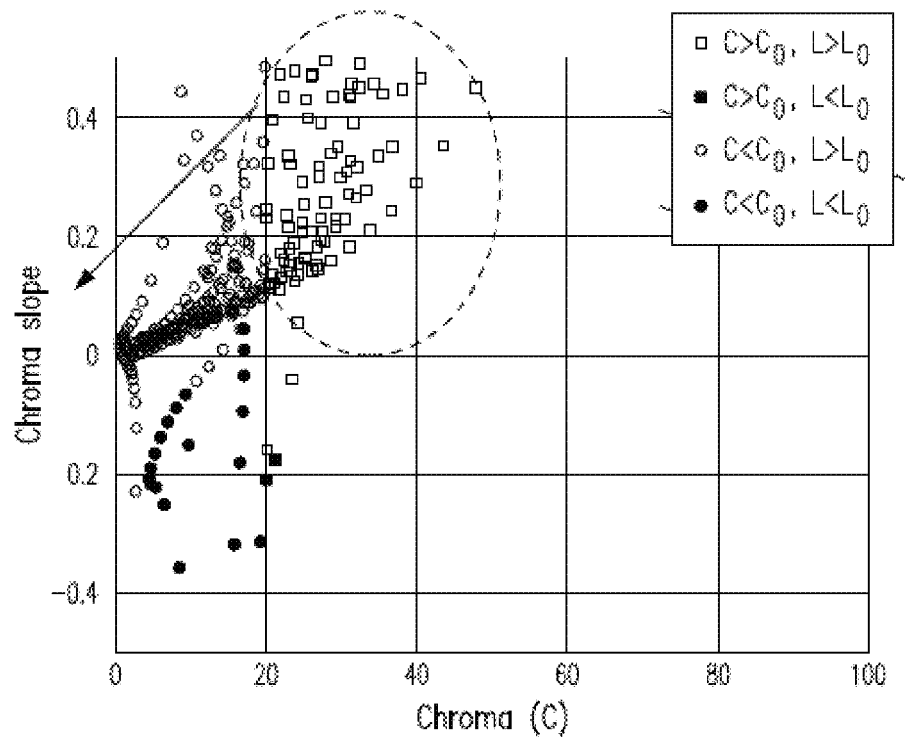
Figure 9C:
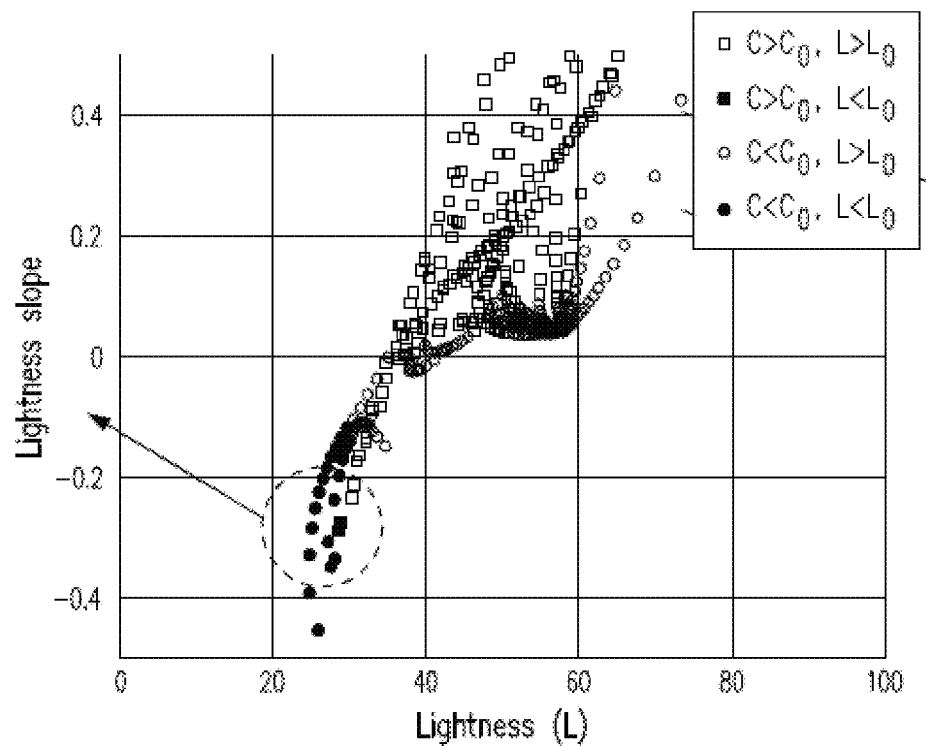
Figure 9D:
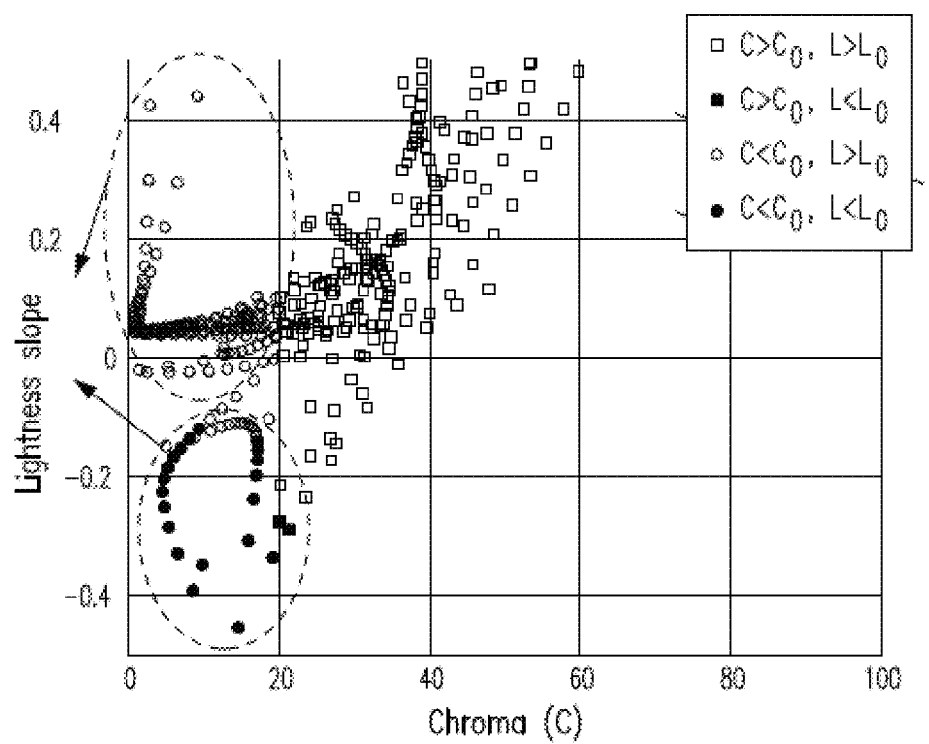

For pigments having a chroma value less than approximately twenty (C<~20), there is often seen relatively small change in both chroma slope dC/dc (%) and lightness slope dL/dc (%). Thus, when using pigment with a chroma value of (C<~20), focus is placed on areas of small change in chroma slope dC/dc (%) or lightness slope dL/dc (%). One such example is shown in FIGS. 8a-8b, which illustrate the same data as FIG. 6, though across a reduced scale on the dC/dc (%) and dL/dc (%) axes, respectively. The data in these figures is divided into four separate groups based on their relation to a threshold chroma ($C_0$) and a threshold lightness ($L_0$). The $C_0$ and $L_0$ values are empirically selected based on the representative data so as to differentiate areas in which positive or negative dC/dc (%) or dL/dc (%) values are applicable.

FIGS. 9a-9d show 2D projections of the same data, though mapped with different combinations of chroma, chroma slope dC/dc (%), lightness, and lightness slope dL/dc (%), at the x and y axes. These figures also show optimal pigment control parameters for each pigment group divided by their relation to the threshold chroma ($C_0$) and threshold lightness ($L_0$) values, as will be discussed further below.

In the exemplary data shown in FIGS. 8-9, a lightness (L) of a manufactured part made of a pure base resin with no added pigment is approximately thirty (L~30). Thus, in this example, a lightness threshold is set to ($L_0$=30), and a chroma threshold is set to the nominal value ($C_0$=20) based on the foregoing observations. Again, the $C_0$ value is empirically selected to differentiate areas in which positive or negative dC/dc (%) values are applicable.

With this, the optical spectral data may be divided into four categories, with identification of a preferred pigment control parameter for each category, as shown in Table III below.

TABLE III

|  | $L > L_0$ | $L < L_0$ |
| --- | --- | --- |
| $C > C_0$ | dC/dc(%)+ | dL/dc(%)− |
| $C < C_0$ | dL/dc(%)+ | dL/dc(%)− |

A preferred pigment control parameter may be identified in each scenario based on the lightness (L) and chroma (C) values, relative to the predetermined lightness threshold ($L_0$) and chroma threshold ($C_0$) values, as explained by the following three guidelines.

[1] When producing a manufactured part with chroma greater than the chroma threshold (C>$C_0$) and lightness greater than the lightness threshold (L>$L_0$), there is a substantial chroma slope dC/dc (%) that is always positive. In such instances, chroma slope dC/dc (%) may be used as a pigment control parameter, with a positive correlation after normalization.

[2] When producing a manufactured part with chroma less than the chroma threshold (C<$C_0$) and lightness greater than the lightness threshold (L>$L_0$), there is a substantial lightness slope dL/dc (%) that is almost always positive. In such instances, lightness slope dL/dc (%) may be used as a pigment control parameter, with a positive correlation after normalization, for most practically used pigments fulfilling these chroma/lightness conditions.

[3] When producing a manufactured part with lightness less than the lightness threshold (L<$L_0$), there is a substantial lightness slope dL/dc (%) that is always negative. In such an instance, lightness slope dL/dc (%) may be used as a pigment control parameter, with a negative correlation after normalization, for most practically used pigments fulfilling this lightness condition, regardless of the chroma value (C).

While not being bound by theory, there may be rare instances when it is necessary to deviate from the rules set forth in Table III, such as when producing a manufactured part with a combination of base material and pigments that results in color that is similar to the base resin shade, which may occur, for example, when producing manufactured parts in dull grayish colors.

Figure 10A:
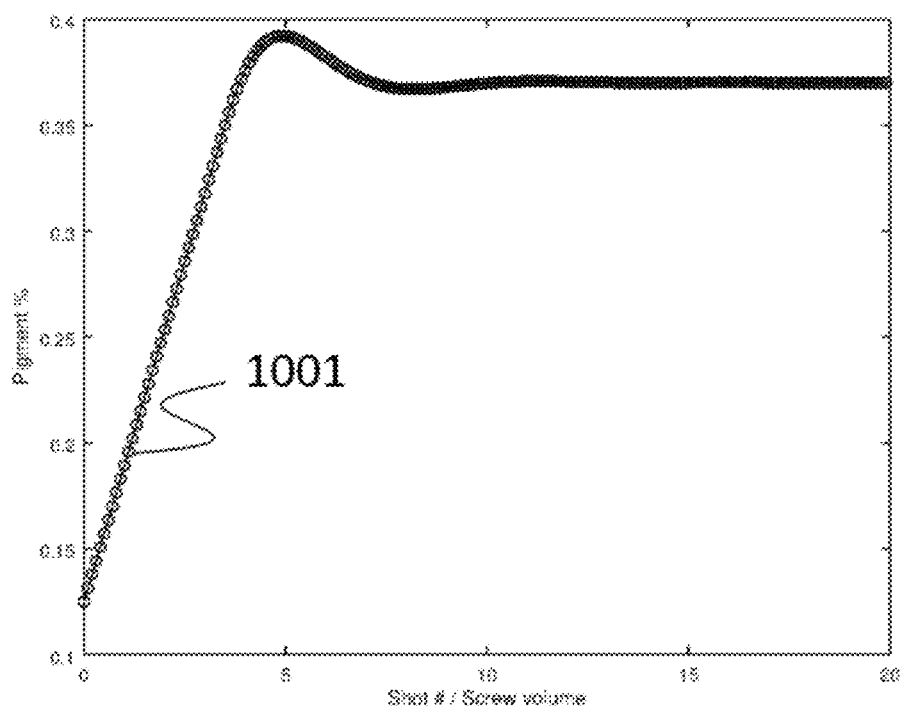
FIGS. 10a-10b show a control process and changes in relevant color parameters with the pigment control parameter, when for starting from pigment concentration lower than the target pigment concentration.
Figure 10B:
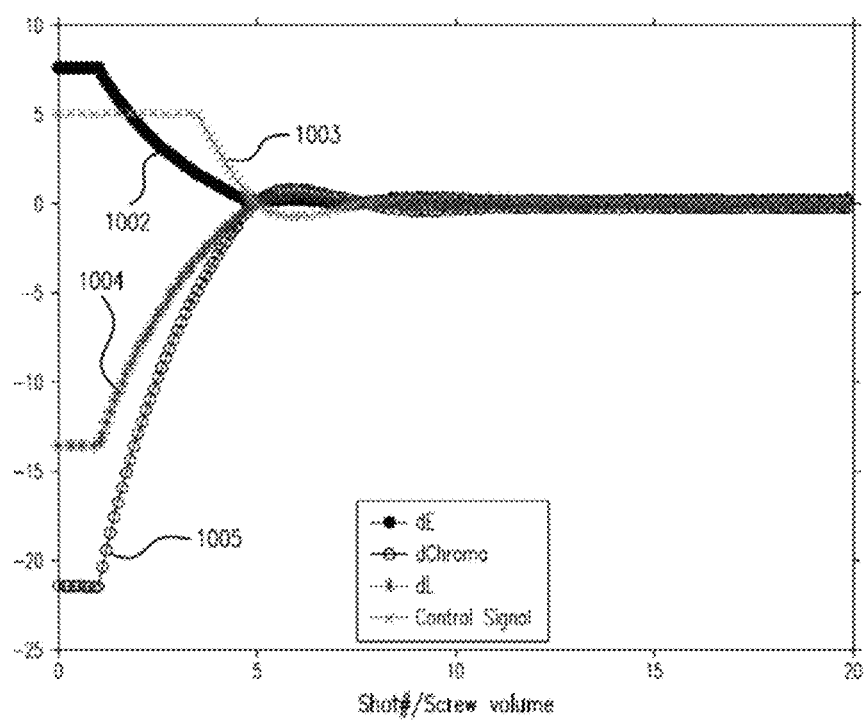

FIGS. 10a-10b show an example of a control process for producing a manufactured part with a yellow pigment at a target pigment concentration of 0.38%, with the process beginning at a starting pigment concentration of 0.13%. FIG. 10a shows the pigment concentration versus shot (machine cycle) number divided by a feeding mechanism volume, which causes a delay between changes to operation of the system and the color of the manufactured part. FIG. 10b shows a change in dE 1002 (a color difference based on the CIEDE2000standard, as known from WO 2015/118535), lightness slope (dL) 1004, chroma slope (dC) 1005, and a control signal 1003. The control signal 1003 is calculated by dL/dc (%) or dC/dc (%), depending on the pigment and the base resign lightness and chroma conditions, as normalized. The control signal 1003 is limited to a predetermined value (5 in the exemplary case shown in FIG. 10b), so as to avoid instability from a feedback loop. The limiting value selected in a given example will depend on plant parameters for the particular process, such as latency arising from a screw volume, distance to a feeding machine and delivery tube volumes, etc.

Figure 11A:
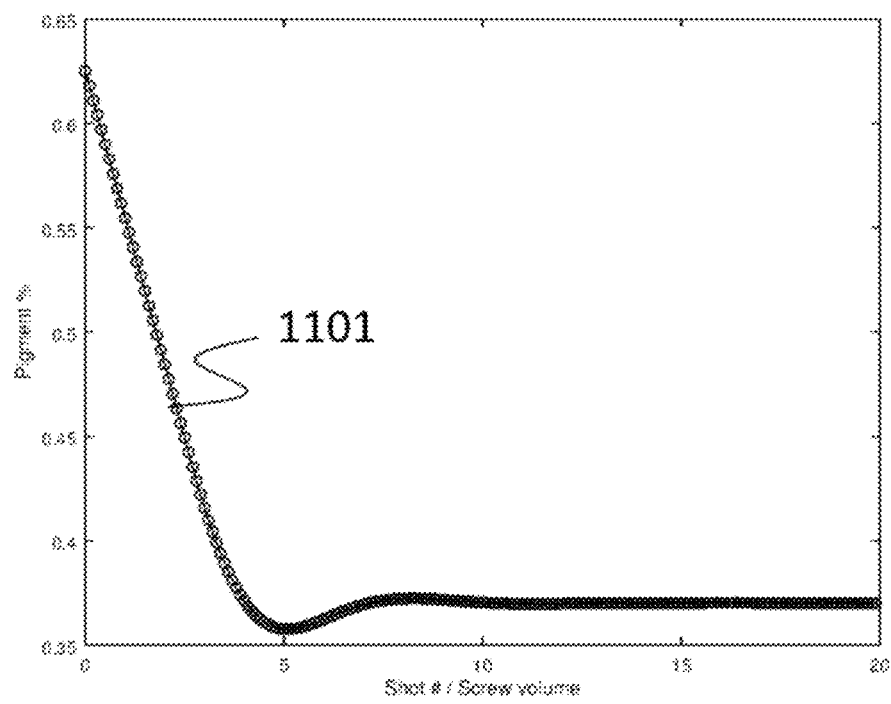
FIGS. 11a-11b show a control process and changes in relevant color parameters with the pigment control parameter, when for starting from pigment concentration higher than the target pigment concentration.
Figure 11B:
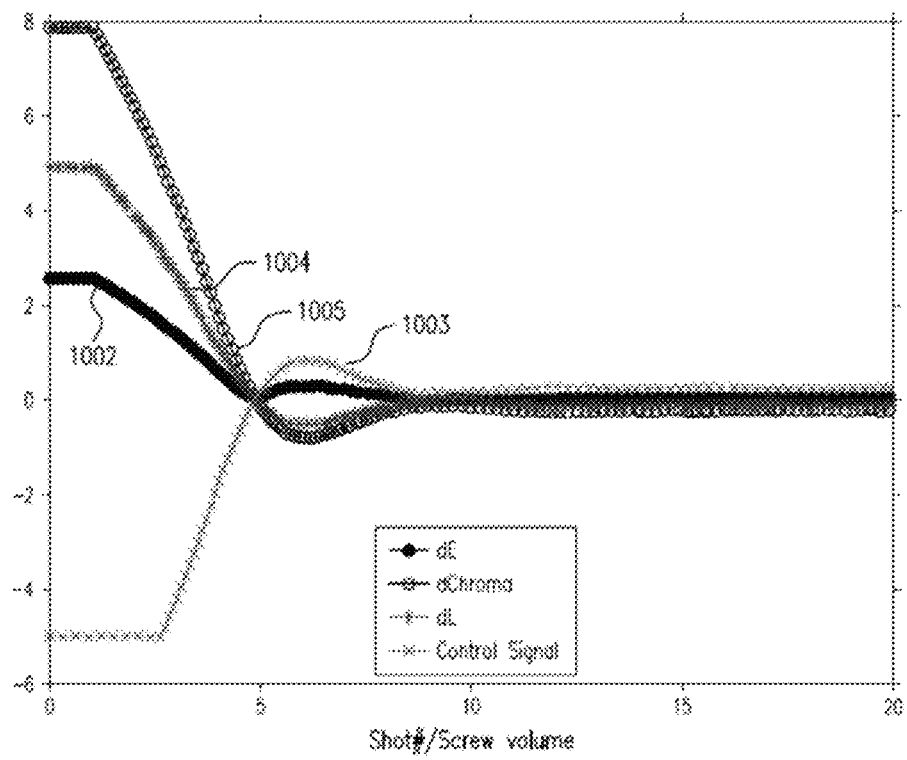

FIG. 11 shows another example of a control process for producing a manufactured part with a yellow pigment at a target pigment concentration of 0.38%, with the process beginning at a starting pigment concentration of 0.63%. FIG. 11a shows the pigment concentration versus shot (machine cycle) number divided by a mixing mechanism volume, which causes a delay between changes to operation of the system and the color of the manufactured part. FIG. 11b shows a change in dE 1002, lightness slope (dL) 1004, chroma slope (dC) 1005, and a control signal 1003.

In certain instances, beginning with a high pigment concentration may cause a color saturation such as that shown in FIG. 3a, with very low lightness slope dL/dc (%) and chroma slope dC/dc (%) values such as that shown in FIG. 3b. In such instances, the pigment concentration may in fact be much higher than a minimal concentration required to produce the target color, and feed rate may thus be reduced to achieve a minimum pigment concentration consistent with the target color(e.g., based on a preset reference pigment). This may be done by repeatedly reducing the pigment concentration by a predetermined quantity until a feedback of dL/dc (%) or dC/dc (%) yields an increase to a minimal pigment concentration for achieving the target color without requiring a change to the color masterbatch feed.

In instances where an excessively high pigment concentration is to be repeatedly reduced to achieve a minimum pigment concentration, a small negative offset value $dc_0$ may be added to the control signal 1003 at each reduction, such that the system will continuously decrease the pigment concentration until the lightness slope dL/dc (%) or chroma slope dC/dc (%) pushes it upward to a minimum pigment concentration, with the offset serving to compensate for color shade deviation to ensure pigment concentration remains within accepted tolerances. FIG. 11a illustrates a correct control process for such a case.

Figure 12:
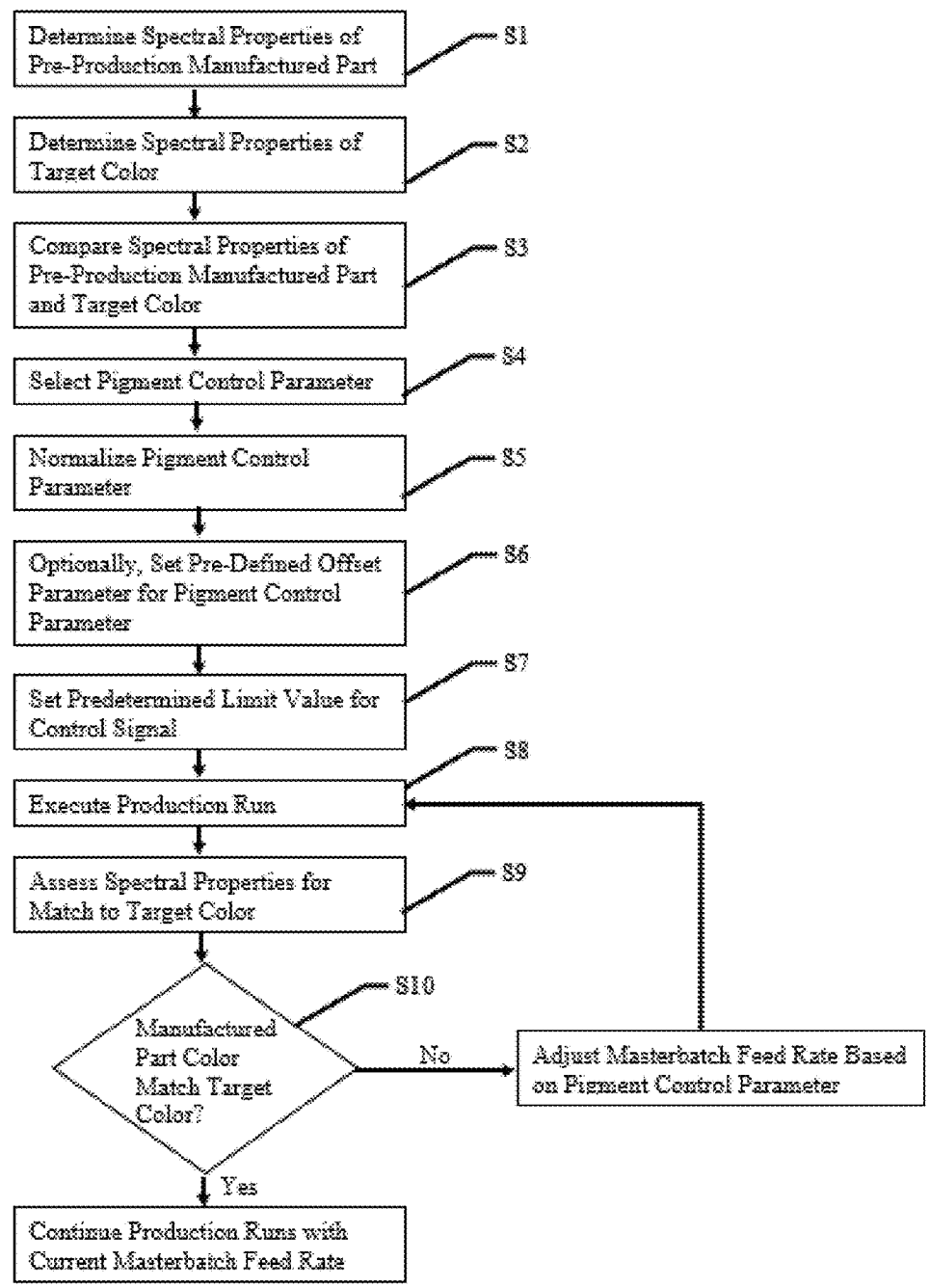
FIG. 12 shows a method for controlling a masterbatch feed rate.

FIG. 12 illustrates an exemplary method of producing a manufactured part according to the present invention. Before beginning a production run, there will first be identified a manufactured part that is to be produced in the production run, and there will also be identified a reference part having a target color, with a target pigment concentration, for use as a reference in applying the target color to the manufactured part produced in the production run.

In a step S1, optical spectral properties of a pre-production manufactured part will be determined, without introduction of any color-additives to the base resin that will be used as raw material for producing the manufactured part. Determination of the optical spectrum properties may be made through actual measurement of a pre-production sample of the manufactured part that is produced without any color-additives, for example, through operation of the system 100; or through an estimation based on pre-established information, for example, from pre-recorded data from previous production runs for producing the manufactured part, or from trial-runs of producing the manufactured part. Alternatively, optical spectrum properties may be obtain from simulation software.

In a step S2, optical spectral properties of the target color for application to the manufactured part are determined. Determination of the optical spectrum properties may be made through actual measurement of a reference part, for example, through operation of the system 100; or through an estimation based on pre-established information, for example, from pre-recorded data on the properties of a selected color from tabulated data. Again, optical spectrum properties may alternatively be obtain from simulation software.

In a step S3, a comparison is made of the optical spectral properties of the pre-production manufactured part and the reference part. In particular, a lightness value of the pre-production manufactured part will be set as a lightness threshold $L_0$, and a lightness value of the reference part will then be assessed as being either greater than or less than the lightness threshold $L_0$. In addition, a chroma threshold $C_0$ is set based physics of the specific pigments to be used, though preferably the threshold $C_0$ is set to approximately $C_0=20$.

In a step S4, a pigment control parameter will then be selected based on the comparison of the optical spectral properties of the pre-production manufactured part and the reference part. The pigment control parameter will be selected from one of a chroma slope dC/dc (%) and a lightness slope dL/dc (%), with either a positive or negative correlation to the target pigment concentration. This selection will be made in accord with the matrix from Table III above.

In a step S5, the selected pigment control parameter is normalized by a predetermined value N obtained from fitting the known (calculated or measured) dL/dc (%) and dC/dc (%)versus the color parameters (e.g., chroma or lightness). After the normalization the N*dL/dc (%) or N*dC/dc (%) will be substantially constant for all colors.

In a step S6, if the production run will be initiated to begin with the color masterbatch being dispensed at a pigment concentration that is greater than the target pigment concentration, then set a pre-defined offset parameter for offsetting the selected pigment control parameter. The offset parameter should be set to a value that will trigger a continuous reduction in the color masterbatch feed rate until such time that the system 100 determines that there has been reached a color masterbatch feed rate that succeeds in applying the color to the manufactured part.

In a step S7, set a predetermined limit value to a control signal for controlling the feed of color masterbatch, with the predetermined limit being set to a value that reduces the likelihood, and preferably eliminates, a control loop instability, with the specific value of the predetermined limit being selected based on one or more plant parameters for the particular process.

In a step S8, execute a production run to produce a manufactured part with a mixture comprising a base resin as the raw material and an amount of color masterbatch dispensed at a first pigmentation concentration based on the selected pigment control parameter.

In a step S9, asses the optical spectral properties of the manufactured part from the most-recent production run to determine a pigment concentration of that manufactured part matches the target pigment concentration.

In a step S10, if the pigment concentration of the most-recent manufactured part matches the target pigment concentration, then continue subsequent production runs with the same controls used in the most-recent production run, including the same color masterbatch feed rate. If the pigment concentration of the most-recent manufactured part does not match the target pigment concentration, then adjust the color masterbatch feed rate based on the pigment control parameter, execute the next production run with the adjusted color masterbatch feed rate, and execute a control loop to repeat steps S8-S10.

Although the present invention is described with reference to particular embodiments, it will be understood to those skilled in the art that the foregoing disclosure addresses exemplary embodiments only; that the scope of the invention is not limited to the disclosed embodiments; and that the scope of the invention may encompass additional embodiments embracing various changes and modifications relative to the examples disclosed herein without departing from the scope of the invention as defined in the appended claims and equivalents thereto.

For example, though the foregoing disclosure discusses the invention with reference to examples in which pigment control is exercised relative to color masterbatches, it will be understood that the invention is also applicable to pigment control in instances where pigments are introduced through other methods such as powders or liquids. It will be further understood that the present invention is also applicable to the control over other non-pigment additives, with a feed rate of other such additives being controlled in similar fashion by correlating a concentration of such additives with spectral properties thereof.

To the extent necessary to understand or complete the disclosure of the present invention, all publications, patents, and patent applications mentioned herein are expressly incorporated by reference herein to the same extent as though each were individually so incorporated. No license, express or implied, is granted to any patent incorporated herein.

The present invention is not limited to the exemplary embodiments illustrated herein, but is instead characterized by the appended claims, which in no way limit the scope of the disclosure.

What is claimed is:

1. A method for controlling a color masterbatch feed rate in production of a manufactured part, comprising:
    a) determining optical spectral properties of a manufactured part based on a raw material of the manufactured part without any color-additives;
    b) determining optical spectral properties of a target color for application to the manufactured part;
    c) determining at least one pigment control parameter based on a relationship of the optical spectral properties of the manufactured part to the optical spectral properties of the target color;
    d) executing a production of the manufactured part with the current pigment feed rate to produce the manufactured part from a mixture material comprising the raw material and a color masterbatch, with the color masterbatch fed to mix with the raw material at a first masterbatch feed rate; and
    e) assessing optical spectral properties of the manufactured part produced form the mixed material to determine if a color of the manufactured part produced from the mixed material matches the target color, wherein
        if it is determined that the color of the manufactured part produced from the mixed material matches the target color, then proceeding to perform subsequent production runs of the manufactured part with the color masterbatch fed at the first pigment feed rate; and if the color of the manufactured part produced from the mixed material does not match the target color, adjusting the pigment feed rate based on the at least one pigment control parameter, and repeating step (d) and step (e) until it is determined that a color of the manufactured part matches the target color.

2. The method according to claim 1, wherein:
determining optical spectral properties of the manufactured part in step (a) comprises determining lightness and chroma properties of the manufactured part; and
determining optical spectral properties of the target color in step (b) comprises determining lightness and chroma properties of the target color.

3. The method according to claim 2, wherein:
selection of the pigment control parameter in step (c) is based on a comparison of the lightness and chroma properties of the manufactured part and the target color.

4. The method according to claim 3, wherein:
comparison of the lightness properties of the manufactured part and the target color comprises setting a lightness value of the manufactured part as a threshold lightness, and determining if a lightness value of the target color is greater than or less than the threshold lightness.

5. The method according to claim 4, wherein:
when a lightness of the target color is less than the threshold lightness, selecting a rate of change of lightness per unit of pigment fraction dL/dc (%) as the pigment control parameter; and
when a lightness of the target color is greater than the threshold lightness, selecting a pigment control parameter based on a comparison of the chroma properties of the manufactured part and the target color.

6. The method according to claim 5, wherein:
when selecting a rate of change of lightness per unit of pigmentation dL/dc (%) as the pigment control parameter, based on a comparison of lightness properties, setting the pigment control parameter dL/dc (%) as a control parameter of negative correlation to a pigment concentration.

7. The method according to claim 5, wherein:
selecting a pigment control parameter based on a comparison of the chroma properties of the manufactured part and the target color comprises setting a chroma value of the target color as a threshold chroma and determining if a chroma value of the manufactured part is greater than or less than the threshold chroma.

8. The method according to claim 7, wherein:
when a chroma of the manufactured part is greater than the chroma threshold, selecting a rate of change of chroma per unit of pigment fraction dC/dc (%) as the pigment control parameter; and when a chroma of the manufactured part is less than the chroma threshold, selecting a rate of change of lightness per unit of pigment fraction dL/dc (%) as the pigment control parameter.

9. The method according to claim 8, wherein:
when selecting a rate of change of chroma per unit of pigmentation dC/dc (%) as the pigment control parameter, based on a comparison of chroma properties, setting the pigment control parameter dC/dc (%) as a control parameter of positive correlation to a pigment concentration.

10. The method according to claim 8, wherein:
when selecting a rate of change of lightness per unit of pigmentation dL/dc (%) as the pigment control parameter, based on a comparison of chroma properties, setting the pigment control parameter dL/dc (%) as a control parameter of positive correlation to a pigment concentration.

11. The method according to claim 1, further comprising:
after selecting a pigment control parameter in step (c), normalizing the selected pigment control parameter by at least one fit curve value.

12. The method according to claim 1, further comprising:
prior to step (d), setting a pre-defined offset parameter for offsetting the selected pigment control parameter to account for color saturation at higher pigment concentrations, wherein the offset parameter is determined in advance to cause a reduction in the color masterbatch feed rate when it is determined in step (e) that a color of the manufactured part produced form the mixed material does not match the target color.

13. The method according to claim 1, further comprising:
setting a limitation on the pigment control parameter to eliminate instability from a feedback control loop.

14. The method according to claim 1, wherein
determining optical spectral properties of the manufactured part in step (a) comprises producing a manufactured part from a raw material without any color-additives and measuring the optical spectral properties of the manufactured part with a spectrometer.

15. The method according to claim 1, wherein
determining optical spectral properties of the manufactured part in step (a) comprises estimating the optical spectral properties of the manufactured part from pre-recorded tabulated data stored in a memory of a controller of a mixing system.

16. The method according to claim 1, wherein
determining the optical spectral properties of the target color in step (b) comprises measuring the optical spectral properties of a reference part having the target color with a spectrometer.

17. The method according to claim 1, wherein
determining the optical spectral properties of the target color in step (b) comprises estimating the optical spectral properties of the target color from pre-recorded tabulated data stored in a memory of a controller of a mixing system.

* * * * *